United States Patent
Takahara et al.

(10) Patent No.: US 9,454,811 B2
(45) Date of Patent: Sep. 27, 2016

(54) IMAGE PROCESSING APPARATUS, IMAGE PROCESSING METHOD AND COMPUTER-READABLE STORAGE MEDIUM STORING PROGRAM

(71) Applicant: ZIOSOFT, INC., Tokyo (JP)

(72) Inventors: Taro Takahara, Tokyo (JP); Satoru Yanagihara, Tokyo (JP); Yutaka Karasawa, Tokyo (JP)

(73) Assignee: ZIOSOFT, INC., Tokyo (JP)

( * ) Notice: Subject to any disclaimer, the term of this patent is extended or adjusted under 35 U.S.C. 154(b) by 0 days.

(21) Appl. No.: 14/682,359

(22) Filed: Apr. 9, 2015

(65) Prior Publication Data

US 2015/0294444 A1 Oct. 15, 2015

(30) Foreign Application Priority Data

Apr. 9, 2014 (JP) .................................. 2014-080111

(51) Int. Cl.
*G06T 5/00* (2006.01)
*G06T 7/00* (2006.01)
*G06T 5/50* (2006.01)

(52) U.S. Cl.
CPC ................. *G06T 5/009* (2013.01); *G06T 5/50* (2013.01); *G06T 7/0012* (2013.01); *G06T 2207/10088* (2013.01); *G06T 2207/20208* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 2001/0007424 A1* | 7/2001 | Kabasawa | ........ | G01R 33/56341 324/312 |
| 2009/0058419 A1* | 3/2009 | Kabasawa | ........ | G01R 33/56341 324/309 |
| 2014/0212017 A1* | 7/2014 | Sugiura | .................. | A61B 5/055 382/131 |

OTHER PUBLICATIONS

Computed Diffusion-weighted MR Imaging May Improve Tumor Detection. M. Blackledge, M. Leach, D. Collins, D. Koh. Nov. 2011.*
A Software Prototype for the Assessment of Tumor Treatment Response using diffusion and perfusion MR Imaging. Vangelis Sakkalis, Georgios C. Manikis, Nickolas Papanikolaou, Ioannis Karatzanis, and Kostas Marias. Sep. 2012.*
Matthew D. Blackledge, Martin O. Leach, David J. Collins, "Computed Diffusion-Weighted MR Imaging May Improve Tumor Detection", Radiology, vol. 261: No. 2, Nov. 2, 2011, p. 573-p. 581.

* cited by examiner

*Primary Examiner* — Stephen R Koziol
*Assistant Examiner* — Delomia L Gilliard
(74) *Attorney, Agent, or Firm* — Pearne & Gordon LLP

(57) ABSTRACT

An image processing apparatus includes an image acquisition unit, a setting unit, an image derivation unit, a luminance condition derivation unit and a display unit. The image acquisition unit acquires a first diffusion-weighted image of a first b value and a second diffusion-weighted image of a second b value. The setting unit sets a target diffusion coefficient and a third b value. The image derivation unit derives a virtual diffusion-weighted image of the third b value based on the target diffusion coefficient, the first diffusion-weighted image and the second diffusion-weighted image. The luminance condition derivation unit derives a luminance condition for displaying the virtual diffusion-weighted image based on the target diffusion coefficient and the third b value. The display unit displays the virtual diffusion-weighted image according to the luminance condition derived by the luminance condition derivation unit.

11 Claims, 10 Drawing Sheets

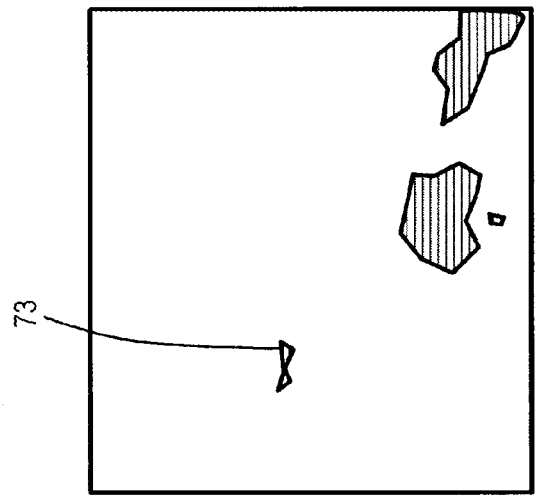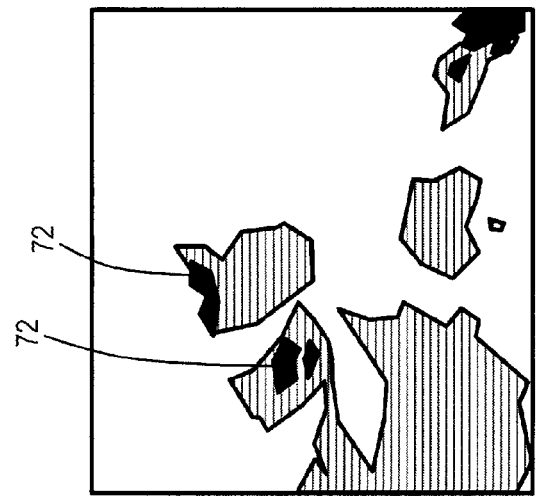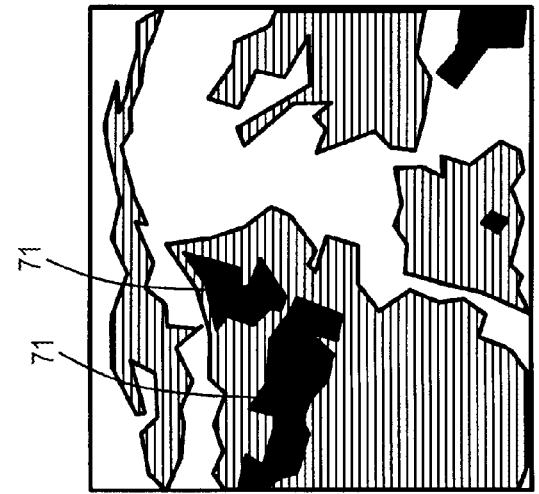

IMAGE PROCESSING APPARATUS, IMAGE PROCESSING METHOD AND COMPUTER-READABLE STORAGE MEDIUM STORING PROGRAM

CROSS-REFERENCE TO RELATED APPLICATION

This application claims priority based on Japanese Patent Application No. 2014-080111, filed on Apr. 9, 2014, the entire contents of which are incorporated by reference herein.

BACKGROUND OF THE INVENTION

1. Field of the Invention

The present invention relates to an image processing apparatus, an image processing method, and a computer-readable storage medium storing program.

2. Related Art

Recently, as a method of imaging information inside a living body using a nuclear magnetic resonance (NMR) phenomenon, magnetic resonance imaging (MRI) is known.

As one of image generation methods using magnetic resonance imaging, diffusion-weighted imaging (DWI) is known. The diffusion-weighted imaging is an image generation method measures diffusion of water in tissue. Which can also detect water diffusion coefficient (ADC: Apparent Diffusion Coefficient).

Recently, as a technique for computing a diffusion-weighted image using an arbitrary b value from a diffusion-weighted image (hereinafter, referred to as a DWI image) imaged using two different b values by diffusionb-weighted imaging, computed DWI (cDWI) is known. As an example of cDWI, a method which generates a computed diffusion-weighted image using a large b value from a real diffusion-weighted image generated using a small b value is known (for example, see Mattew D. Blackledge, Martin O. Leach, David J. Collins, "Computed Diffusion-Weighted MR Imaging May Improve Tumor Detection", Radiology, Volume 261: Number 2, Nov. 2, 2011, P573-P581).

SUMMARY OF THE INVENTION

An image processing apparatus of the invention includes an image acquisition unit, a setting unit, an image derivation unit, a luminance condition derivation unit and a display unit. The image acquisition unit acquires a first diffusion-weighted image of a first b value and a second diffusion-weighted image of a second b value. The setting unit sets a target diffusion coefficient and a third b value. The image derivation unit derives a virtual diffusion-weighted image of the third b value based on the target diffusion coefficient, the first diffusion-weighted image and the second diffusion-weighted image. The luminance condition derivation unit derives a luminance condition for displaying the virtual diffusion-weighted image based on the target diffusion coefficient and the third b value. The display unit displays the virtual diffusion-weighted image according to the luminance condition derived by the luminance condition derivation unit.

An image processing method in an image processing apparatus of the invention includes: acquiring a first diffusion-weighted image of a first b value and a second diffusion-weighted image of a second b value; setting a target diffusion coefficient and a third b value; deriving a virtual diffusion-weighted image of the third b value based on the target diffusion coefficient, the first diffusion-weighted image and the second diffusion-weighted image; deriving a luminance condition for displaying the virtual diffusion-weighted image based on the target diffusion coefficient and the third b value; and displaying the virtual diffusion-weighted image on a display unit according to the derived luminance condition.

A non-transitory computer-readable storage medium of the invention stores program for causing a computer to execute operations include: acquiring a first diffusion-weighted image of a first b value and a second diffusion-weighted image of a second b value; setting a target diffusion coefficient and a third b value; deriving a virtual diffusion-weighted image of the third b value based on the target diffusion coefficient, the first diffusion-weighted image and the second diffusion-weighted image; deriving a luminance condition for displaying the virtual diffusion-weighted image based on the target diffusion coefficient and the third b value; and displaying the virtual diffusion-weighted image on a display unit according to the derived luminance condition.

BRIEF DESCRIPTION OF THE DRAWINGS

FIGS. 7A to 7C are schematic views showing a display example of an image obtained by the image processing apparatus in the embodiment.

DETAILED DESCRIPTION OF THE INVENTION

Figure 1:
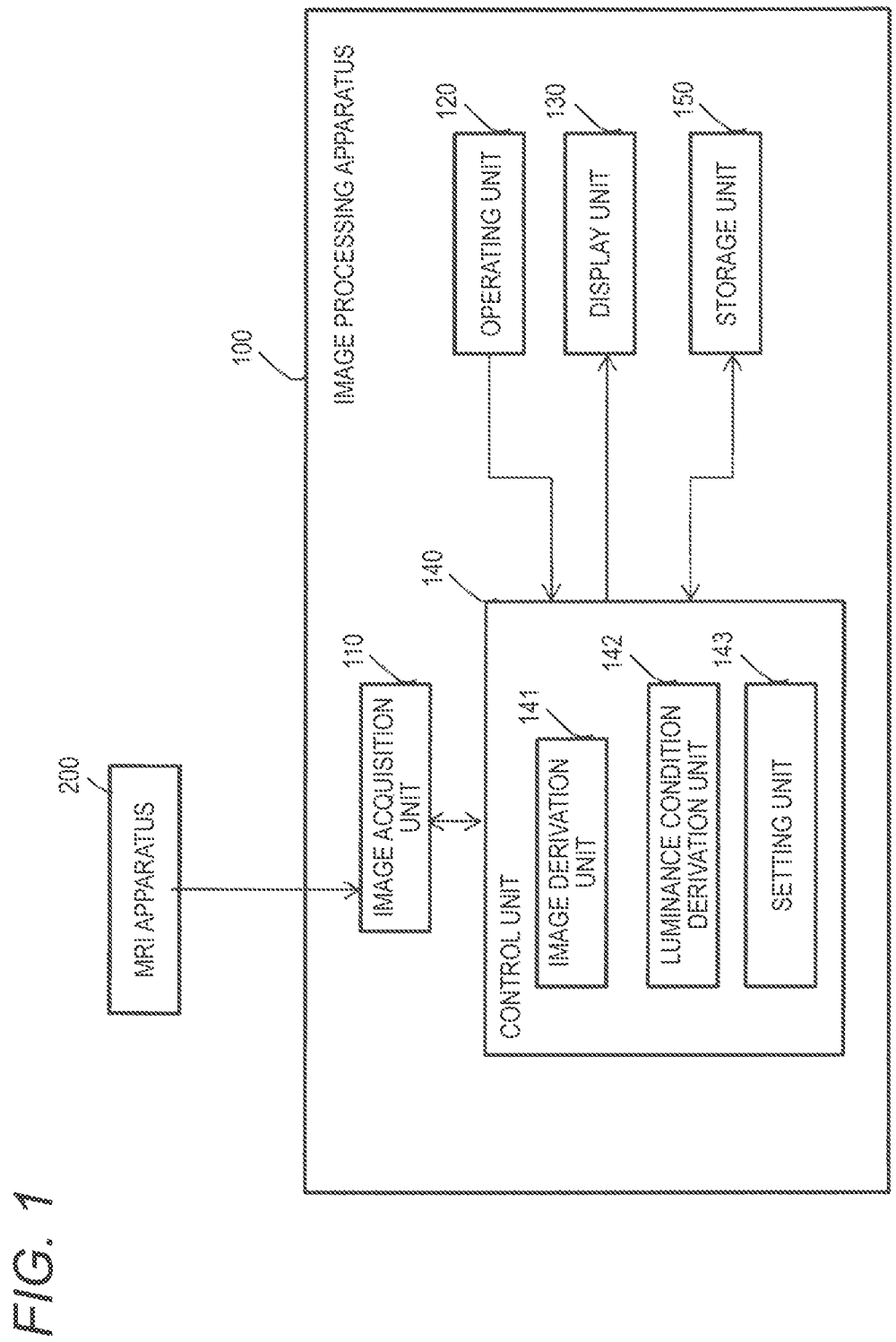
FIG. 1 is a block diagram showing a configuration example of an image processing apparatus in an embodiment.

Hereinafter, an embodiment of the invention will be described referring to the drawings.

(Process through which a Form of the Invention is Obtained)

A pixel value (referred to as signal intensity (SI)) of a diffusion-weighted image is represented by (Expression 1).

[Equation 1]

$$SI = k \times PD \times \left(1 - e^{-\frac{TR}{T1}}\right) \times e^{-\frac{TE}{T2}} \times e^{-b \cdot ADC} \quad \text{(Expression 1)}$$

(Expression 1) includes a coefficient "b" and a coefficient "ADC" in the final-stage term of $e^{-b \cdot ADC}$. The coefficient "b" represents a b value which expresses intensity of a gradient magnetic field (MPG: Motion Probing Gradients) for diffusion weighting. The coefficient "ADC" represents an apparatus diffusion coefficient ADC of a tissue. The value (ADC value) of the ADC is determined by, a composition of a tissue.

Figure 9:
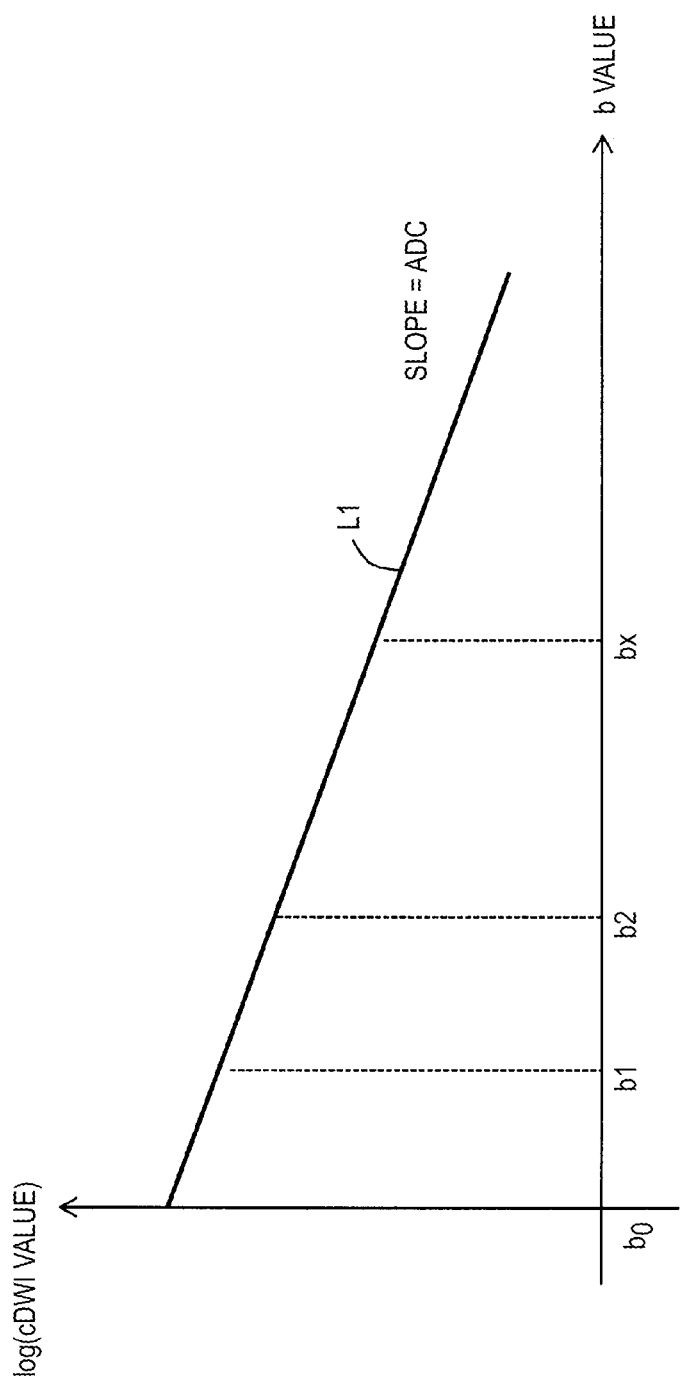
FIG. 9 is a schematic view showing the relationship between a b value and a pixel value of a virtual diffusion-weighted image.

FIG. 9 is a schematic view showing the relationship between a b value and a pixel value SI of a virtual diffusion-weighted image. Hereinafter, the pixel value SI of the virtual diffusion-weighted image is referred to as a cDWI value. In FIG. 9, the natural logarithm of the pixel value SI is represented as log (cDWI value). It should be noted that log(A) represents the natural logarithm of A.

From (Expression 1), theoretically, log (cDWI value) which is the natural logarithm of the pixel value SI of the virtual diffusion-weighted image changes linearly with respect to the b value. Accordingly, when there are a plurality of b values (for example, b1 and b2), and log (cDWI value) of each b value is acquired, an ADC value can be derived as a slope of a line L1. If the value of the ADC is derived, the pixel value SI can be derived as log (cDWI value) of an arbitrary b value=bx in the line L1.

Since the exponent of the final stage of (Expression 1) becomes a negative value (−b·ADC), the line L1 has a negative slope. Accordingly, the larger the b value, the smaller log(cDWI value). For this reason, a virtual diffusion-weighted image with a large b value has a small pixel value. Therefore, when the virtual diffusion-weighted image is displayed on a display device, and when the luminance of the display device is changed corresponding to the pixel value of the virtual diffusion-weighted image, the luminance value is lowered and visibility is degraded.

Figure 10:
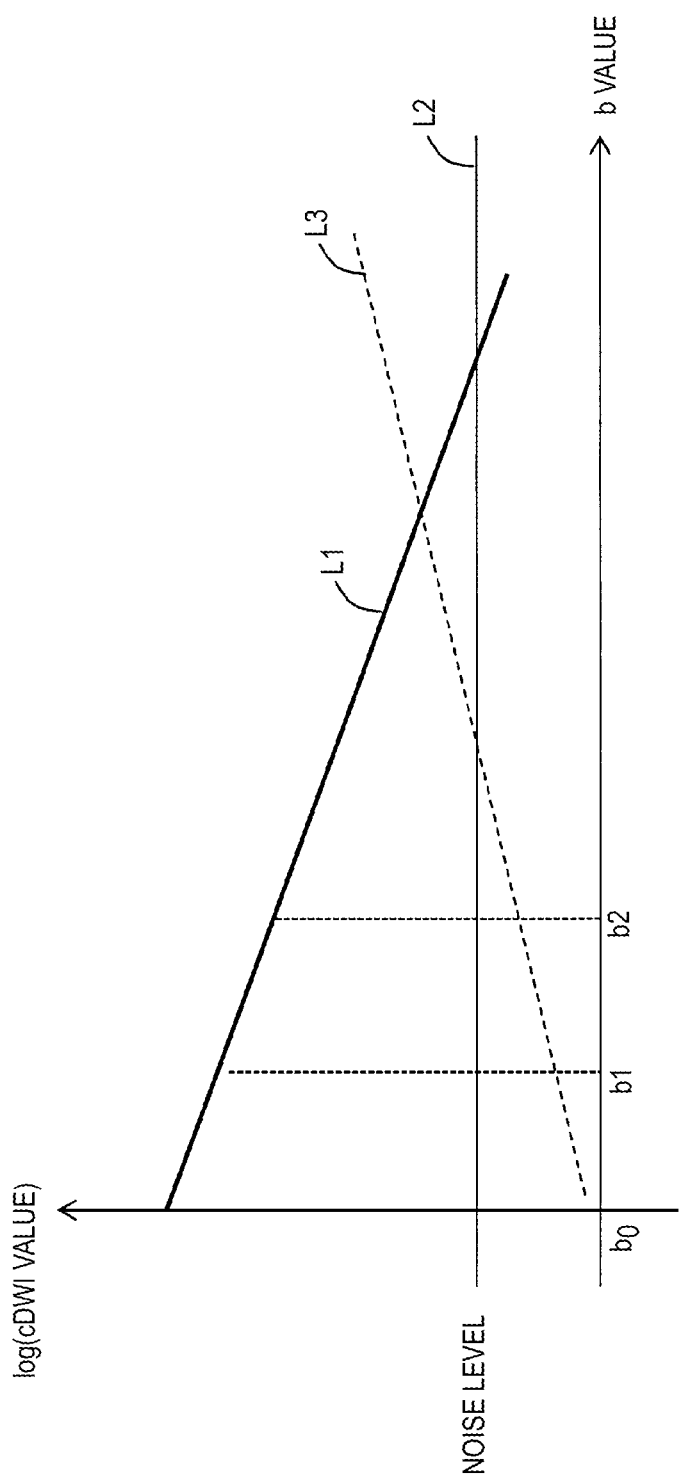
FIG. 10 is a schematic view showing the relationship between a b value and a noise level included in each of a diffusion-weighted image and a virtual diffusion-weighted image.

FIG. 10 is a schematic view showing the relationship between a virtual diffusion-weighted image and a noise level included in each of a diffusion-weighted image among b-value. There is noise in the diffusion-weighted image at a given level regardless of the b value. Accordingly, the degree of noise included in the virtual diffusion-weighted image is determined by noise in the diffusion-weighted image. A line L2 represents an example of a noise level in the diffusion-weighted image for the b value. Therefore, when a virtual diffusion-weighted image is generated from a plurality of diffusion-weighted images, the noise level is changed along with the pixel value of the virtual diffusion-weighted image.

Accordingly, in a tissue represented in the line L2, since a pixel value SI with a large b value is buried in noise, it is difficult to directly measure the pixel value SI. In a region where the signal intensity of the diffusion-weighted image is high, the pixel value SI is acquired (b1 or b2), and a virtual diffusion-weighted image with a large b value is computed using the pixel value SI, thereby improving an apparent SN ratio in the large b value (see Mattew D. Blackledge, Martin O. Leach, David J. Collins, "Computed Diffusion-Weighted MR Imaging May Improve Tumor Detection", Radiology, Volume 261: Number 2, Nov. 2, 2011, P573-P581).

However, even though the b value is low, in a tissue with a small pixel value SI, as represented in a line L3, there is a case, in a virtual diffusion-weighted image, when the b value is large, noise is amplified and the signal to noise ratio (SN ratio) decreases. For this reason, visibility of the virtual diffusion-weighted image may be degraded.

In the observation of the virtual diffusion-weighted image, since it is possible to freely generate a virtual diffusion-weighted image by a plurality of b values, it is desirable that change in diffusion can be observed in a diseased region while changing the b value. As shown in FIG. 9, the b value increases, log (cDWI value) decreases, and the pixel value of the virtual diffusion-weighted image decreases. For this reason, it becomes difficult to observe the diseased region.

There is an apparatus which can manually adjust the luminance of the virtual diffusion-weighted image to be displayed when displaying the virtual diffusion-weighted image. However, when manually adjusting luminance, objectivity is insufficient, and it becomes too complicated to set luminance of many virtual diffusion-weighted images for every time. While it is considered to separately adjust luminance of a virtual diffusion-weighted image by an individual b value, as described above, there is a possibility that luminance is erroneously adjusted by a pixel with amplified noise, and it is difficult to maintain objectivity and visibility of observation using the virtual diffusion-weighted image.

Hereinafter, an image processing apparatus, an image processing method, and an image processing program capable of improving visibility of a virtual diffusion-weighted image displayed will be described.

In the invention, an image processing apparatus includes an image acquisition unit, at least one processor, a display unit and at least one memory. At least one processor functions as a setting unit, an image derivation unit, and a luminance condition derivation unit. The image acquisition unit acquires a first diffusion-weighted image of a first b value and a second diffusion-weighted image of a second b value. The setting unit sets a target diffusion coefficient and a third b value. The image derivation unit derives a virtual diffusion-weighted image of the third b value based on the target diffusion coefficient, the first diffusion-weighted image and the second diffusion-weighted image. The luminance condition derivation unit derives a luminance condition for displaying the virtual diffusion-weighted image based on the target diffusion coefficient and the third b value. The display unit displays the virtual diffusion-weighted image according to the luminance condition derived by the luminance condition derivation unit. At least one memory stores the first and second diffusion-weighted images, the first, second and third b values, the target diffusion coefficient, the virtual diffusion-weighted image and the luminance condition.

First Embodiment

FIG. 1 is a block diagram showing a configuration example of an image processing apparatus 100 in a first embodiment. The image processing apparatus 100 includes an image acquisition unit 110, an operating unit 120, a display unit 130, a control unit 140, and a storage unit 150. The control unit 140 includes an image derivation unit 141, a luminance condition derivation unit 142, and a setting unit 143. The image processing apparatus 100 acquires an image from an MRI apparatus 200 and performs processing on the acquired image.

The MRI apparatus 200 images a diffusion-weighted image using a set b value by magnetic resonance imaging. The diffusion-weighted image generated by the MRI apparatus 200 is, for example, volume data including information of an arbitrary place inside a living body. The diffusion-weighted image is imaged, whereby the pixel value of each pixel in the diffusion-weighted image is obtained.

The image acquisition unit 110 acquires the diffusion-weighted image imaged by the MRI apparatus 200 and the b value (for example, b1 or b2) when the diffusion-weighted image is imaged. For example, the image acquisition unit 110 may acquire the diffusion-weighted image and the b value from the MRI apparatus 200 by communication through a wired line or a wireless line or may acquire the diffusion-weighted image and the b value through an arbitrary storage medium (not shown).

The operating unit 120 includes, for example, a touch panel, a pointing device (for example, a mouse), and a keyboard. The operating unit 120 receives an arbitrary input operation from a user (for example, a physician or a radiology technician) of the image processing apparatus 100. The operating unit 120 receives, for example, an input operation of a b value (for example, bx) for deriving a virtual diffusion-weighted image by the image derivation unit 141 or an image operation, such as a magnifying scale power of a display image or parallel movement. The operating unit 120 receives, for example, an input operation to set an ADC value (target ADC value) corresponding to a disease or a tissue to be observed.

The display unit 130 includes, for example, a liquid crystal display (LCD), and displays various kinds of information. The display unit 130 displays, for example, a virtual diffusion-weighted image, a diffusion-weighted image, and various operation screens. The display unit 130 displays, for example, a virtual diffusion-weighted image based on information of a luminance condition described below.

The control unit 140 includes, for example, a central processing unit (CPU) or a digital signal processor (DSP). The control unit 140 includes, for example, a read only memory (ROM) or a random access memory (RAM). The CPU or DSP executes an image processing program stored in the ROM or RAM, thereby realizing the respective functions of the control unit 140.

The image derivation unit 141 derives (for example, calculates) a virtual diffusion-weighted image based on a plurality of diffusion-weighted images. For example, as shown in FIG. 9, the image derivation unit 141 derives an ADC value from different b values (for example, b1 and b2) and the pixel values of a plurality of diffusion-weighted images imaged using these b values. For example, the ADC value is derived as the slope of the line L1 of FIG. 9. The image derivation unit 141 derives a virtual diffusion-weighted image when the b value=bx based on the ADC value, that is, the pixel value of the virtual diffusion-weighted image.

The image derivation unit 141 derives the ADC value for each pixel from the diffusion-weighted images made of a plurality of different b values (for example, b1 and b2). The pixel value of the virtual diffusion-weighted image when the b value=bx is derived for each pixel.

Figure 2:
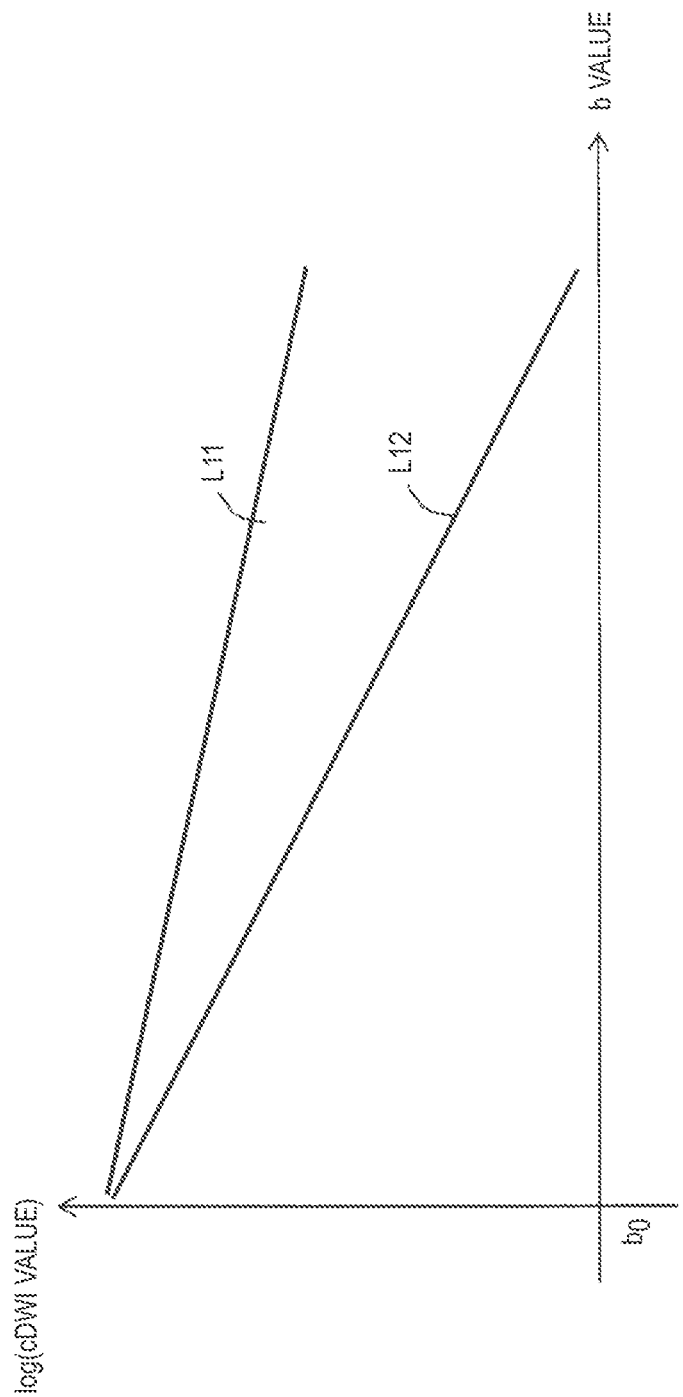
FIG. 2 is a schematic view showing an example of the relationship between a plurality of b values and ADC values in the embodiment.

The relationship between the b value and the value of the ADC for each disease will be described. FIG. 2 is a schematic view showing an example of a b value and an ADC for each disease. In FIG. 2, two lines L11 and L12 representing ADC values are different in slope. The slope of the line L11 represents, for example, an ADC value when a pixel of a region to be observed of a virtual diffusion-weighted image is a tumor tissue, and the slope of the line L12 represents, for example, an ADC value when a pixel of a region to be observed of a virtual diffusion-weighted image is a normal tissue. In this way, the ADC value is generally determined by the type of tissue or disease, and changes by tissue or disease.

The luminance condition derivation unit 142 derives a luminance condition when displaying a virtual diffusion-weighted image on the display unit 130. For example, the luminance condition derivation unit 142 derives a luminance condition when displaying a virtual diffusion-weighted image on the display unit 130 based on the value of the b value=bx and the target ADC value.

The MRI apparatus 200 images a diffusion-weighted image as image data in 12-bit gradation (−2048 to 2047 or 0 to 4095), for example. The display unit 130 displays image data in 8-bit gradation (0 to 255), for example.

In a diffusion-weighted image or a virtual diffusion-weighted image, a meaningful range effective for detection of diseases is generally a part of the diffusion-weighted image for the virtual diffusion-weighted image, not the entire diffusion-weighted image or virtual diffusion-weighted image. The luminance condition derivation unit 142 derives a luminance condition such that the number of gradations of a part of the diffusion-weighted image or the virtual diffusion-weighted image becomes the number of gradations of the display unit 130.

The luminance condition includes, for example, a window width (ww) and a window level (wl). The window width represents the width (range) of the pixel value of the diffusion-weighted image or the virtual diffusion-weighted image displayed on the display unit 130. The window level represents the center value of the width of the pixel value of the diffusion-weighted image or the virtual diffusion-weighted image displayed on the display unit 130.

Figure 3:
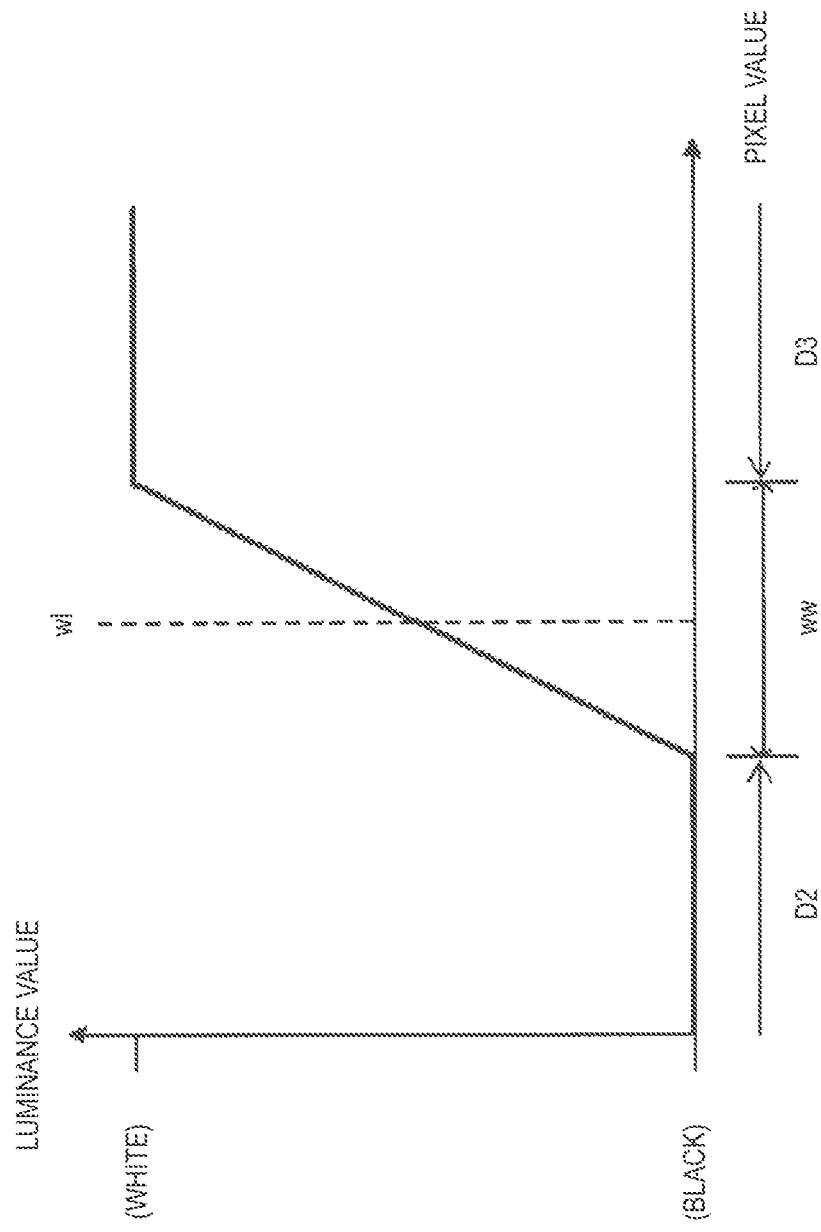
FIG. 3 is a schematic view showing an example of the relationship between a pixel value of a virtual diffusion-weighted image and output luminance of a display unit in the embodiment.

FIG. 3 is a schematic view showing an example of the relationship between a pixel value of a virtual diffusion-weighted image and an output luminance (luminance value) of the display unit 130. Inside the window width ww, the pixel value of the virtual diffusion-weighted image is converted to a gray level in the output luminance of the display unit 130.

In a region D2 (in FIG. 3, the left side of ww) outside the window width ww, the pixel value of the virtual diffusion-weighted image is comparatively small, and the output luminance is around 0. Accordingly, in the region D2, display on the display unit 130 is darkened, and becomes close to black. In the other region D3 (in FIG. 3, the right side of ww) outside the window width ww, the pixel value of the virtual diffusion-weighted image is comparatively large, and the output luminance increases. Accordingly, in the region D3, display on the display unit 130 is brightened, and becomes close to white.

In this way, the window width and the window level are used for luminance adjustment (contrast or brightness).

For example, when an input operation is received by the operating unit 120, the setting unit 143 performs various settings based on input information.

The storage unit 150 stores various images (for example, diffusion-weighted image and virtual diffusion-weighted image), various kinds of data, various programs, and various kinds of information (for example, setting information set manually or automatically).

Next, an operation example of the image processing apparatus 100 will be described.

Figure 4:
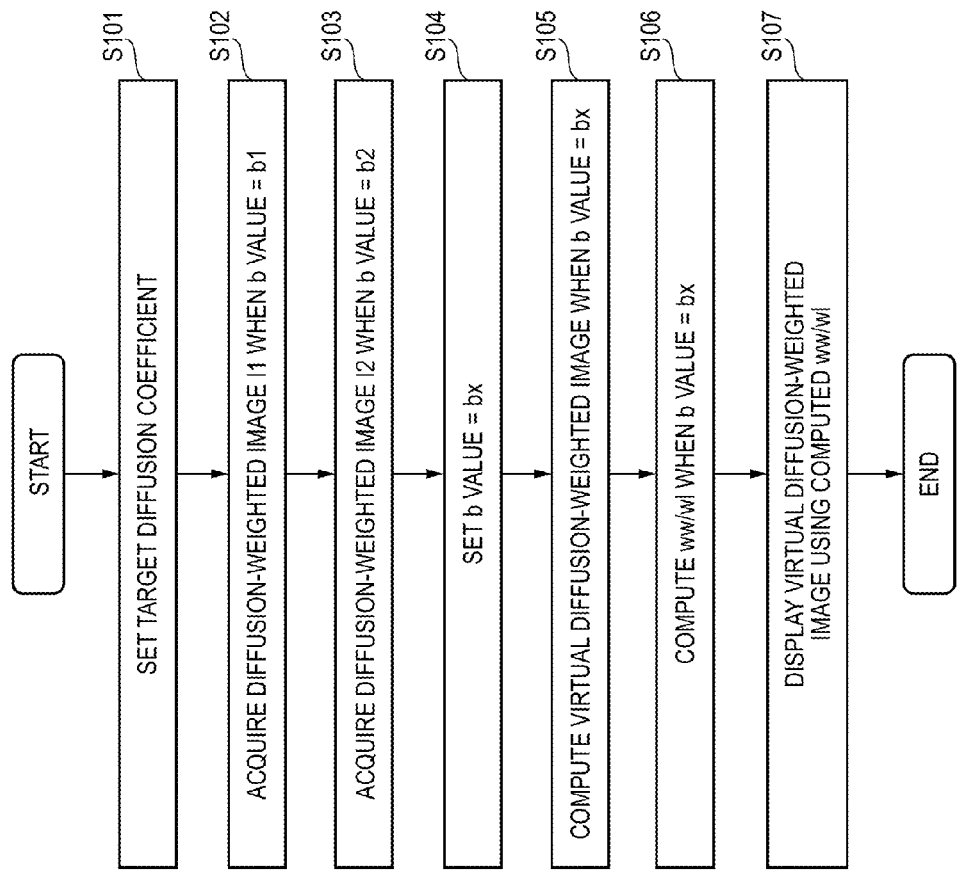
FIG. 4 is a flowchart showing an operation example of the image processing apparatus in the embodiment.

FIG. 4 is a flowchart showing an operation example of the image processing apparatus 100.

First, the operating unit 120 receives an input of designating a target diffusion coefficient (target ADC value), and the setting unit 143 sets the target diffusion coefficient from the operating unit 120 (S101). In most cases where a physician observes a diseased region, the target diffusion coefficient ADC is predictable. For example, a diffusion coefficient to be a target (target diffusion coefficient, target ADC value) is input through the operating unit 120 in consideration of a disease desired to be observed by the user.

Subsequently, the image acquisition unit 110 acquires a diffusion-weighted image I1 when the b value is b1 from the MRI apparatus 200 (S102). The pixel value of the diffusion-weighted image I1 is different for each pixel (for example, each of 512×512 pixels). The value of b1 at this time is stored in the storage unit 150 along with the diffusion-weighted image I1.

Subsequently, the image acquisition unit 110 acquires a diffusion-weighted image I2 when the b value is b2 from the MRI apparatus 200 (S103). The pixel value of the diffusion-weighted image I2 is different from each pixel (for example, each of 512×512 pixels). The value of b2 at this time is stored in the storage unit 150 along with the diffusion-weighted image I2.

Subsequently, the operating unit 120 receives an input of designating the b value to be bx, and the setting unit 143 sets bx from the operating unit 120 as the b value (S104). bx is an arbitrary value, and for example, is input by a slider GUI operation through the operating unit 120.

Subsequently, the image derivation unit 141 derives (for example, calculates) a virtual diffusion-weighted image Ix when the b value is bx (S105). The pixel value of the virtual diffusion-weighted image Ix is different for each pixel (for example, each of 512×512 pixels).

Subsequently, the luminance condition derivation unit 142 derives a luminance condition when the b value is bx. In this case, the luminance condition derivation unit 142 derives a window width and a window level based on the bx and the target diffusion coefficient (S106). The details of the derivation of the window width and the window level will be described below.

Subsequently, the display unit 130 adjusts the luminance of the display unit 130 using the derived window width and window level and displays the virtual diffusion weighted image Ix at bx (S107).

The processing of S101 may be executed after S105.

According to the processing of FIG. 4, it is possible to derive a virtual diffusion-weighted image from a plurality of diffusion-weighted images imaged by the MRI apparatus 200. The processing of S104 to S107 is repeated (b value=bx1, bx2, . . . ), whereby it is possible to generate and display many virtual diffusion-weighted images subjected to this luminance adjustment. The luminance condition of the virtual diffusion-weighted image is derived based on the pixel value of the imaged diffusion-weighted image or another virtual diffusion-weighted image or the b value corresponding to this image. Accordingly, when it is not necessary to perform manual luminance adjustment when a virtual diffusion-weighted image is displayed, it is possible to improve user convenience and to improve objectivity or reliability of diagnosis performed while confirming the display of the virtual diffusion-weighted image.

For example, there are many cases where the degree (for example, diffusion coefficient ADC) of change in diffusion of a diseased region desired to be observed by a physician is known empirically. For this reason, for example, the luminance condition derivation unit 142 derives the luminance condition using the ADC value designated by the physician through the operating unit 120. The display unit 130 adjusts luminance according to the luminance condition when displaying the virtual diffusion-weighted image.

For example, the luminance condition derivation unit 142 derives a new luminance condition when changing the b value through the operating unit 120 while the physician is observing a region to be observed. In this case, since the luminance of the region to be observed of the designated ADC value is maintained regardless of change in b value, it is possible to facilitate distinction from a region other than the region to be observed. Since the pixel value of a region of a near ADC value is appropriately changed within a gray scale, it is possible to allow the user to observe the region to be observed with a desired gray scale and to improve detection accuracy of diseases. The near ADC value is, for example, the average of the ADC values included in a region of interest set by the user through the operating unit 120. The near ADC value may be the average of the ADC values in a circular region included in a range determined in advance from a point designated by the user. The near ADC value may be a value obtained by statistically processing the ADC values in a range determined in advance from a point designated by the user.

Next, a derivation example of a window width and a window level for a b value will be described.

Figure 5:
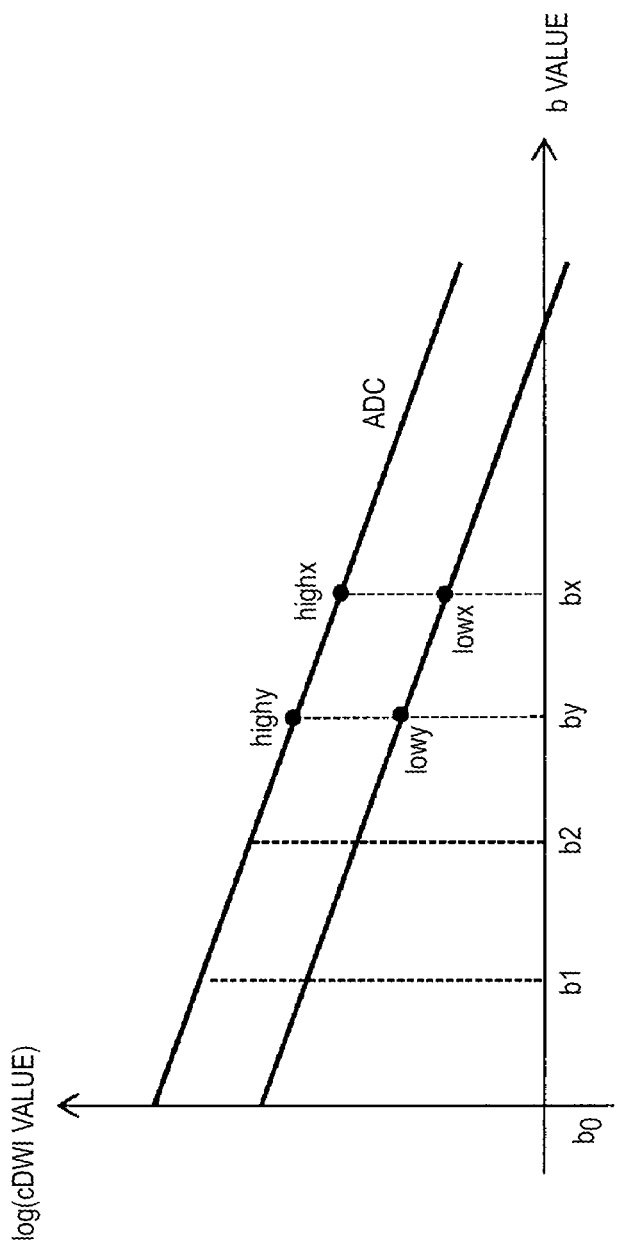
FIG. 5 is a schematic view showing a first derivation example of a window width and a window level for a b value in the embodiment.

FIG. 5 is a schematic view showing a first derivation example of a window width and a window level for a b value.

In S101 of FIG. 4, if the target diffusion coefficient is set, for example, the operating unit 120 receives an input operation to set a window width and a window level with an arbitrary b value as by. The setting unit 143 sets the window width and the window level received by the operating unit 120. The value of by is arbitrary, and may be, for example, b1 or b2. In this case, for example, although the window width and the window level are set through the operating unit 120 during imaging with b1 or b2, the window width and the window level may be set by the setting unit 143. For example, the values of the window width and the window level are set by the pixel value of the diffusion-weighted image or the virtual diffusion-weighted image.

If the window width and the window level with by are set, the luminance condition derivation unit 142 acquires the pixel value (hereinafter, referred to as "highy") of the virtual diffusion-weighted image in the upper limit of the window width with by. Similarly, the luminance condition derivation unit 142 acquires the pixel value (hereinafter, referred to as "lowy") of the virtual diffusion-weighted image in the lower limit of the window width with by from the virtual diffusion-weighted image.

The operating unit 120 receives an input of designating the value of the b value=bx, and the setting unit 143 sets the value of bx from the operating unit 120 as the b value. bx is an arbitrary value, and is input, for example, by a user's slide operation through the operating unit 120.

The luminance condition derivation unit 142 derives log(highx) and log(lowx) based on log(highy), log(lowy), and the target ADC.

The luminance condition derivation unit 142 derives a window width and a window level with bx based on highx and lowx. In this case, for example, the luminance condition derivation unit 142 derives the window width (ww) and the window level (wl) as follows.

$$ww = highx - lowx$$

$$wl = (highx + lowx)/2$$

According to the first derivation example of ww/wl, it is possible to improve the output luminance of the display unit 130 without depending on the b value for a pixel whose ADC value substantially matches the target ADC value among the pixels of the virtual diffusion-weighted image. For example, the ADC value is different for each tissue or disease. The target ADC value is set, whereby a window width and a window level conforming to the target ADC value are derived. For this reason, it is possible to observe a specific diseased tissue or a similar tissue with high visibility while changing the b value. Therefore, it is possible to improve detection accuracy of diseases.

Figure 6:
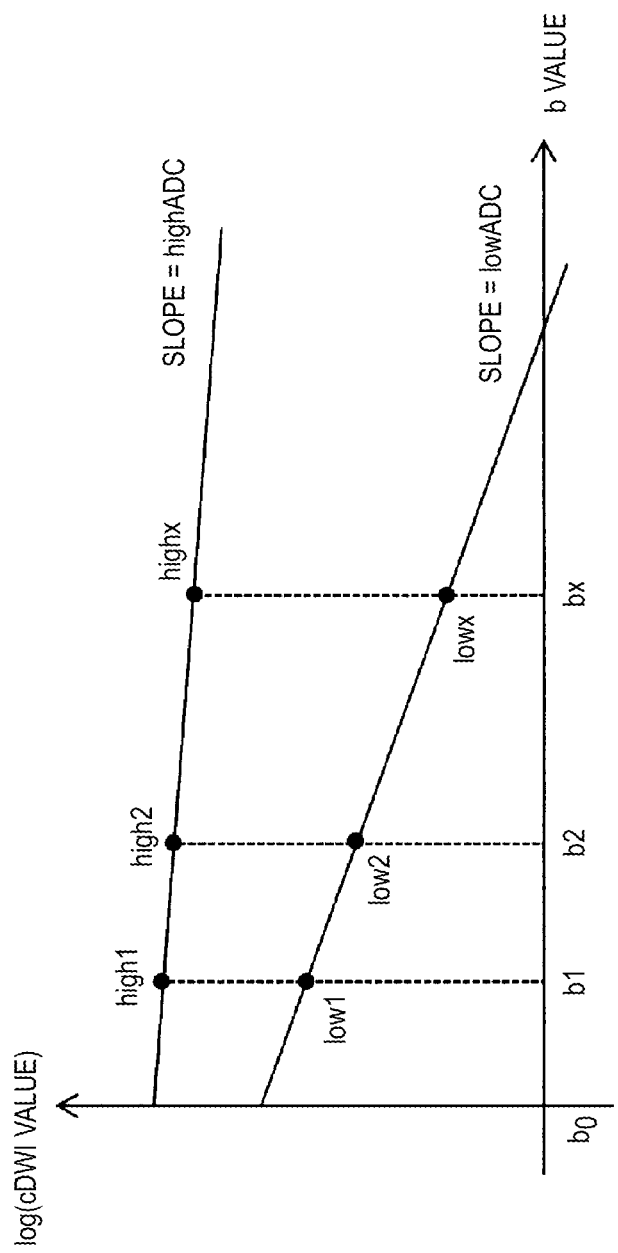
FIG. 6 is a schematic view showing a second derivation example of a window width and a window level for a b value in the embodiment.

FIG. 6 is a schematic view showing a second derivation example of a window width and a window level for a b value.

The control unit 140 may derive an ADC value as a diffusion coefficient to be observed according to a window width and a window level set when the diffusion-weighted image I1 is imaged using b1 and a window width and a window level set when the diffusion-weighted image I2 is imaged using b2. The derived ADC value may be set as a target diffusion coefficient by the setting unit 143.

The window width and the window level when the b value is either b1 or b2 are set by the user through the operating unit 120 when the diffusion-weighted image is imaged by the MRI apparatus 200. For this reason, it is supposed that there is a given basis for setting the window width and the window level. Accordingly, the window width and the window level of b1 or b2 may be set as the window width and the window level of by. A plurality of target diffusion coefficients may be derived. Although a window width and a window level for performing luminance adjustment have been illustrated, more flexible luminance adjustment using a look-up table (LUT) or the like may be performed. A color may be further added for luminance adjustment. Besides, arbitrary luminance adjustment means may be used.

In FIG. 6, a case where a plurality of target ADC values to be used when calculating a window width and a window level is illustrated.

For example, the operating unit 120 receives an input operation to set a window width and a window level when the b value=b1. The setting unit 143 sets information of the window width and the window level received by the operating unit 120.

Similarly, the operating unit 120 receives an input operation to set a window width and a window level when the b value=b2. The setting unit 143 sets information of the window width and the window level received by the operating unit 120. For example, the values of the window width and the window level are set by the pixel value of the diffusion-weighted image or the virtual diffusion-weighted image.

If the window width and the window level with b1 are set, the luminance condition derivation unit 142 acquires the pixel value (hereinafter, referred to as "high1") of the virtual diffusion-weighted image in the upper limit of the window width with b1.

If the window width and the window level with b1 are set, the luminance condition derivation unit 142 acquires the pixel value (hereinafter, referred to as "low1") of the virtual diffusion-weighted image in the lower limit of the window width with b1.

If the window width and the window level with b2 are set, the luminance condition derivation unit 142 acquires the pixel value (hereinafter, referred to as "high2") of the virtual diffusion-weighted image in the upper limit of the window width with b2.

If the window width and the window level with b2 are set, the luminance condition derivation unit 142 acquires the pixel value (hereinafter, referred to as "low2") of the virtual diffusion-weighted image in the lower limit of the window width with b2.

The luminance condition derivation unit 142 derives (for example, calculates) an ADC value (highADC) to be observed as the slope of a line passing through log(high1) and log(high2) based on log(high1) and log(high2).

The luminance condition derivation unit 142 derives (for example, calculates) an ADC value (lowADC) to be observed as the slope of a line passing through log(low1) and log(low2) based on log(low1) and log(low2).

The luminance condition derivation unit 142 derives (for example, calculates) the natural logarithm (log(highx)) of the pixel value (highx) of the virtual diffusion-weighted image in the upper limit of the window width with bx based on log(high1) or log(high2) and highADC.

The luminance condition derivation unit 142 derives (for example, calculates) the natural logarithm (log(lowx)) of the pixel value (lowx) of the virtual diffusion-weighted image in the lower limit of the window width with by based on log(low1) or log(low2) and lowADC.

The luminance condition derivation unit 142 derives the window width and the window level with bx based on highx and lowx. In this case, for example, the luminance condition derivation unit 142 derives the window width (ww) and the window level (wl) as follows.

$$ww = highx - lowx$$

$$wl = (highx + lowx)/2$$

According to the second derivation example of ww/wl, the ADC value to be observed is derived according to the values of the window width and the window level set by a user's operation or the like when the diffusion-weighted image is imaged. In the setting of the window width and the window level when the diffusion-weighted image is imaged, there are many cases where the set values are adjusted by the user in consideration of tissues or diseases. Therefore, it is possible to set the derived ADC values (highADC and lowADC) as a reliable target ADC value. The setting unit 143 may set the respective derived ADC values (highADC and lowADC) as the target diffusion coefficients.

Accordingly, for example, when a virtual diffusion-weighted image is further derived, it is possible to improve the output luminance of the display unit 130 depending on the b value for a pixel whose ADC value substantially matches the target ADC value among the pixels of the virtual diffusion-weighted image. For example, the ADC value is different for each tissue or disease. The target ADC value is set, whereby the window width and the window level conforming to the target ADC value are derived. For this reason, it is possible to observe a specific diseased tissue or a similar tissue with high visibility while changing the b value. Therefore, it is possible to improve detection accuracy of diseases.

Next, a display example of an image which is obtained by the image processing apparatus 100 will be described.

FIGS. 7A to 7C are schematic views showing a display example of an image which is obtained by the image processing apparatus 100. In FIGS. 7A to 7C, for simplification of description, a black portion represents a portion with a large luminance value, and a white portion represents a portion with a small luminance value. While a pixel value within a window width is displayed on a gray level, in FIGS. 7A to 7C, a region of a gray level has a pattern.

FIG. 7A illustrates a diffusion-weighted image as an original image displayed on the display unit 130 when a b value=500, wl=174, and ww=302.

FIG. 7B illustrates a virtual diffusion-weighted image displayed on the display unit 130 when the b value=1500, wl=78, and ww=136. FIG. 7B illustrates a case where the luminance condition derivation unit 142 derives a luminance condition based on, for example, a target diffusion coefficient and the b value=1500, and a virtual diffusion-weighted image is displayed.

FIG. 7C illustrates a virtual diffusion-weighted image displayed on the display unit 130 when the b value=1500, wl=174, and ww=302. FIG. 7C illustrates a case where the luminance condition derivation unit 142 does not derive a luminance condition, for example, the user manually adjusts the luminance of the display unit 130, and a virtual diffusion-weighted image is displayed.

In the diffusion-weighted image of FIG. 7A, since the b value=500, the b value is small compared to the virtual diffusion-weighted image of FIG. 7B and the virtual diffusion-weighted image of FIG. 7C. For this reason, the pixel value of the diffusion-weighted image becomes comparatively high. Therefore, an image including a region 71 around a diseased region is comparatively brightened, and detection accuracy of diseases is degraded.

In the virtual diffusion-weighted image of FIG. 7C, since luminance adjustment is not performed, it is illustrated that a region 73 supposed to be a disease is displayed small, but does not enter a state capable of discriminating as a disease. Even if luminance adjustment is performed manually, there is no guarantee that the region 73 is appropriately displayed.

In regards to the virtual diffusion-weighted image of FIG. 7B, the luminance condition (for example, window width and window level) is derived by the luminance condition derivation unit 142, and the luminance of the display unit 130 is adjusted according to the luminance condition. Therefore, for example, a luminance condition is derived while designating a different ADC value for each disease to be a target, whereby it is possible to improve the luminance of the display unit 130 when the b value is changed.

Accordingly, even when the b value is comparatively large, since the luminance of a diseased region 72 is not degraded, as shown in FIG. 7C, it is possible to suppress reduction of a visible diseased region. Since the value of the ADC is different for each property of a tissue, a pixel value of a normal tissue around the diseased region 72 is lowered when the b value increases. Therefore, as shown in FIG. 7A, the whole is brightened, whereby it is possible to suppress difficulty in specifying the position of a disease since a diseased tissue or a normal tissue are mixed in a bright portion.

Figure 8B:
FIGS. 8A to 8D are schematic views showing a display example of an image obtained by the image processing apparatus in the embodiment.
Figure 8D:
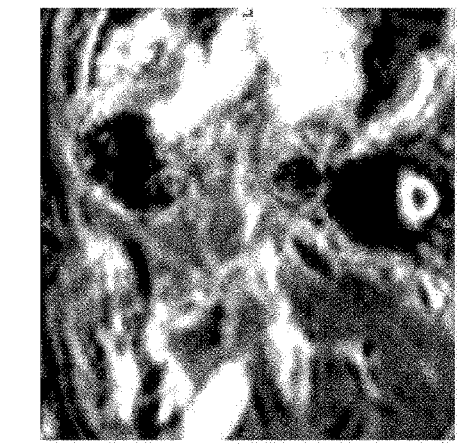
Figure 8A:
Figure 8C:
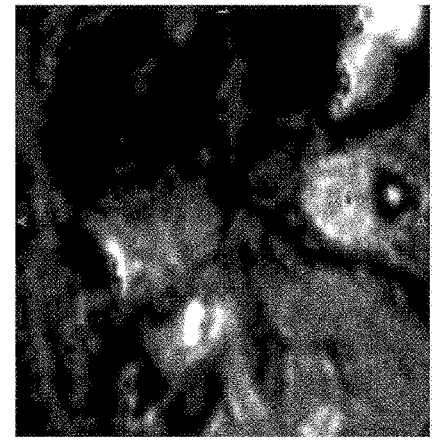

FIG. 8A is a schematic view showing a display example of a diffusion-weighted image corresponding to the b value=50. FIG. 8B is a schematic view showing a display example of a diffusion-weighted image corresponding to the b value=500. FIG. 8C is a schematic view showing a display example of a virtual diffusion-weighted image corresponding to the b value=1500. FIG. 8D is a schematic view showing a display example of an ADC map. The ADC map represents the diffusion coefficient ADC in the form of an image.

According to the image processing apparatus 100, the luminance condition of the virtual diffusion-weighted image is derived based on the pixel value of the diffusion-weighted image or another virtual diffusion-weighted image or the b values corresponding to these images. Therefore, since manual luminance adjustment when the virtual diffusion-weighted image is displayed is not required, it is possible to improve user convenience and to suppress objectivity or reliability of diagnosis performed by the user while confirming the display of the virtual diffusion-weighted image.

As described above, the luminance condition of the virtual diffusion-weighted image is derived, whereby, even if the b value increases and the pixel value of the virtual diffusion-weighted image is lowered, it is possible to improve the output luminance of the display unit 130 in the region to be observed. Since luminance of the image is adjusted such that the luminance of the region to be observed is maintained within a given range, it is possible to improve observation efficiency of disease and detection accuracy of diseases. Therefore, it is possible to improve visibility of the region to be observed of the virtual diffusion-weighted image.

That is, the apparent luminance of the diseased region on the display unit 130 is not changed, whereby it is possible to improve accuracy of diagnosis by the user. For example, it is guaranteed that a pixel whose diffusion coefficient (ADC value) is substantially equal to the target diffusion coefficient (target ADC value) is not much changed with change in b value when displayed on the display unit 130. Therefore, when displaying the virtual diffusion-weighted image on the display unit 130, it is possible to facilitate the specification of diseases while dynamically changing the b value.

Image display by the image processing apparatus 100 is compared with image display using so-called AutoWindow. AutoWindow is processing for setting a window width and a window level based on statistical information of pixel values included in image data, for example, using a histogram. For example, the window width of AutoWindow is calculated by a variance of pixel values with a constant factor. The window level of AutoWindow is calculated by an average of pixel values.

When AutoWindow is used and a diseased region is enhanced, the output luminance of the display unit in the diseased region is significantly changed, and the calculation of the window width and the window level by AutoWindow is not appropriate for enhancing the image of the diseased region.

In particular, in the virtual diffusion-weighted image, noise may be enhanced, thereby affecting the window width and the window level of AutoWindow. As a result, reliability of statistical processing in which the pixel values of the respective pixels are collected is degraded.

When AutoWindow is used, since a window width and a window level are set for each pixel configuring volume data, there is a possibility that the relationship of the window width and the window level is lost between different b values. When AutoWindow is used, as shown in FIG. 10, the noise level increases with an increase in b value. For this reason, in AutoWindow using the statistical processing, there is a possibility that the values of the window width and the window level are not stable.

In contrast, according to the image processing apparatus 100, as shown in FIGS. 7A to 7C, since it is possible to extract a diseased region without reducing the diseased region and to exclude a peripheral region of the diseased region from extraction, it is possible extract a diseased region with high accuracy. Since a desired luminance condition can be derived by the luminance condition derivation unit 142, manual luminance adjustment of the display unit 130 is not required. Therefore, objectivity and reliability of the virtual diffusion-weighted image are secured, whereby it is possible to improve visibility when the virtual diffusion-weighted image is displayed on the display unit 130.

The invention is not limited to the above-described embodiment, and can be applied to any configuration insofar as the functions described in the appended claims or the functions of the configuration of this embodiment can be attained.

For example, in the above-described embodiment, when the position of a diseased region is understood to some extent, for example, the user can set a region of interest (ROI) in a virtual diffusion-weighted image displayed on the display unit 130 through the operating unit 120. The image derivation unit 141 may derive a target diffusion coefficient so as to match the ADC value of the set region of interest.

For example, the b value is changed in the same region of interest, whereby a diffusion-weighted image at each b value is imaged by the MRI apparatus 200. As shown in FIG. 9, the image derivation unit 141 derives the slope of the line L1 based on a plurality of b values and the pixel values of the diffusion-weighted images to derive the ADC value of the region of interest. The setting unit 143 may be set the derived ADC value as the target diffusion coefficient.

In the above-described embodiment, for example, candidates of a target diffusion coefficient may be prepared according to tissues or diseases. For example, when tumor diagnosis is performed, an ADC value for diagnosing a tumor is included in the candidates of the target diffusion coefficient. A preset value is, for example, stored in the storage unit 150, and is displayed on the display unit 130 as a candidate of the target diffusion coefficient. For example, the setting unit 143 may set a candidate selected by a user's operation through the operating unit 120 as the target diffusion coefficient. The display unit 130 is an example of a provision unit.

For example, in the above-described embodiment, the image derivation unit 141 may generate a virtual diffusion-weighted image from diffusion-weighted images using three or more b values. For example, the image derivation unit 141 may calculate an ADC value using a least-squares method according to the three or more b values and the pixel values of the diffusion-weighted images using the respective b values. With this, noise of each ADC value is reduced, and as a result, noise of the virtual diffusion-weighted image is reduced.

(Outline of an Aspect of the Invention)

An image processing apparatus of the invention includes an image acquisition unit, a setting unit, an image derivation unit, a luminance condition derivation unit and a display unit. The image acquisition unit acquires a first diffusion-weighted image of a first b value and a second diffusion-weighted image of a second b value. The setting unit sets a target diffusion coefficient and a third b value. The image derivation unit derives a virtual diffusion-weighted image of the third b value based on the target diffusion coefficient, the first diffusion-weighted image and the second diffusion-weighted image. The luminance condition derivation unit derives a luminance condition for displaying the virtual diffusion-weighted image based on the target diffusion coefficient and the third b value. The display unit displays the virtual diffusion-weighted image according to the luminance condition derived by the luminance condition derivation unit.

With this configuration, for example, it is possible to derive the luminance condition according to the respective set b values, the pixel value of the diffusion-weighted image, and the target diffusion coefficient without needing a user's operation. Accordingly, it is possible to improve user convenience and to suppress objectivity or reliability of diagnosis performed while confirming the display of the virtual diffusion-weighted image. Furthermore, the target diffusion coefficient is set, whereby it is possible to improve the output luminance of the display unit depending on the b value, for example, for a pixel whose diffusion coefficient substantially matches the target diffusion coefficient among the pixels of the virtual diffusion-weighted image. For example, since the diffusion coefficient is different for each disease or tissue, it is possible to observe a specific diseased tissue or a similar tissue with high visibility while changing the b value. Therefore, it is possible to improve detection accuracy of diseases.

In the image processing apparatus of the invention, the luminance condition derivation unit dynamically derives the luminance condition when the third b value is changed by the setting unit.

With this configuration, even when change in diffusion is observed continuously in a region to be observed while changing the b value, it is possible to accurately set the luminance condition and to suppress excessive change in the luminance value of the display unit according to the b value. Therefore, it is possible to continuously observe the region to be observed and to improve detection accuracy of diseases.

In the image processing apparatus of the invention, the setting unit sets a region of interest in the first diffusion-weighted image and sets the target diffusion coefficient based on a pixel value included in the region of interest.

With this configuration, for example, it is possible to set a diffusion coefficient of a region to be observed in the diffusion-weighted image estimated as a diseased region by the user as a target diffusion coefficient in a state where the diffusion-weighted image is displayed on the display unit. In this case, since the user can set the region to be observed consciously, it is possible to improve reliability of the target diffusion coefficient using the display of the diffusion-weighted image.

The image processing apparatus of the invention further includes a provision unit which displays candidates of the target diffusion coefficient. The setting unit sets the target diffusion coefficient from the candidates of the target diffusion coefficient.

With this configuration, for example, it is possible to easily select the target diffusion coefficient according to diseases or tissues and to improve user convenience.

The image processing apparatus of the invention further includes a diffusion coefficient derivation unit which derives a diffusion coefficient. The setting unit sets a first luminance condition for displaying the first diffusion-weighted image and a second luminance condition for displaying the second diffusion-weighted image. The diffusion coefficient derivation unit derives the diffusion coefficient based on the first luminance condition and the second luminance condition set by the setting unit. The setting unit sets the derived diffusion coefficient as the target diffusion coefficient.

With this configuration, it is possible to set the target diffusion coefficient according to an actual value of the luminance condition set when the diffusion-weighted image is imaged. For example, since the luminance condition set when the diffusion-weighted image is imaged is set consciously by the user, it is possible to improve reliability of the target diffusion coefficient.

In the image processing apparatus of the invention, the setting unit sets a plurality of target diffusion coefficients.

With this configuration, for example, it is possible to set the target diffusion coefficient corresponding to a plurality of diseases or tissues desired to be observed by the user and to observe the diseases or tissues while suppressing degradation of the luminance of the diseases or tissues. Therefore, it is possible to allow the user to observe the diseases or tissues with high visibility while changing the b value, and to improve detection accuracy of diseases.

In the image processing apparatus of the invention, the image acquisition unit acquires a third diffusion-weighted image imaged using a fourth b value. The image derivation unit derives a virtual diffusion-weighted image of the fourth b value based on the third diffusion-weighted image.

With this configuration, the image quality of the virtual diffusion-weighted image is improved.

In the image processing apparatus of the invention, the luminance condition includes at least one of a window width of a virtual diffusion-weighted image displayed on the display unit and a window level of the virtual diffusion-weighted image.

With this configuration, it is possible to adjust the window width and the window level without needing a user's manual operation. Therefore, it is possible to improve objectivity and reliability of the window width and the window level.

An image processing method in an image processing apparatus of the invention includes: acquiring a first diffusion-weighted image of a first b value and a second diffusion-weighted image of a second b value; setting a target diffusion coefficient and a third b value; deriving a virtual diffusion-weighted image of the third b value based on the target diffusion coefficient, the first diffusion-weighted image and the second diffusion-weighted image; deriving a luminance condition for displaying the virtual diffusion-weighted image based on the target diffusion coefficient and the third b value; and displaying the virtual diffusion-weighted image on a display unit according to the derived luminance condition.

According to this method, for example, it is possible to derive the luminance condition according to the respective set b values, the pixel value of the diffusion-weighted image, and the target diffusion coefficient without needing a user's operation. Accordingly, it is possible to improve user convenience and to improve objectivity or reliability of diagnosis performed while confirming the display of the virtual diffusion-weighted image. Furthermore, the target diffusion coefficient is set, whereby it is possible to improve the output luminance of the display unit depending on the b value, for example, for a pixel whose diffusion coefficient substantially matches the target diffusion coefficient among the pixels of the virtual diffusion-weighted image. For example, since the diffusion coefficient is different for each disease or tissue, it is possible to observe a specific diseased tissue or a similar tissue with high visibility while changing the b value. Therefore, it is possible to improve detection accuracy of diseases.

A non-transitory computer-readable storage medium of the invention stores program for causing a computer to execute operations include: acquiring a first diffusion-weighted image of a first b value and a second diffusion-weighted image of a second b value; setting a target diffusion coefficient and a third b value; deriving a virtual diffusion-weighted image of the third b value based on the target diffusion coefficient, the first diffusion-weighted image and the second diffusion-weighted image; deriving a luminance condition for displaying the virtual diffusion-weighted image based on the target diffusion coefficient and the third b value; and displaying the virtual diffusion-weighted image on a display unit according to the derived luminance condition.

According to this program, for example, it is possible to derive the luminance condition according to the respective set b values, the pixel value of the diffusion-weighted image, and the target diffusion coefficient without needing a user's operation. Accordingly, it is possible to improve user convenience and to suppress objectivity or reliability of diagnosis performed while confirming the display of the virtual diffusion-weighted image. Furthermore, the target diffusion coefficient is set, whereby it is possible to improve the output luminance of the display unit depending on the b value, for example, for a pixel whose diffusion coefficient substantially matches the target diffusion coefficient among the pixels of the virtual diffusion-weighted image. For example, since the diffusion coefficient is different for each disease or tissue, it is possible to observe a specific diseased tissue or a similar tissue with high visibility while changing the b value. Therefore, it is possible to improve detection accuracy of diseases.

What is claimed is:

1. An image processing apparatus comprising:
   an image acquisition unit that acquires a first diffusion-weighted image of a first b value and a second diffusion-weighted image of a second b value;
   a setting unit that sets a target diffusion coefficient and a third b value;
   an image derivation unit that derives a virtual diffusion-weighted image of the third b value based on the first diffusion-weighted image and the second diffusion-weighted image;
   a luminance condition derivation unit that derives a luminance condition for displaying the virtual diffusion-weighted image based on the target diffusion coefficient and the third b value; and
   a display unit that displays the virtual diffusion-weighted image according to the luminance condition derived by the luminance condition derivation unit.

2. The image processing apparatus according to claim 1, wherein the luminance condition derivation unit dynamically derives the luminance condition when the third b value is changed by the setting unit.

3. The image processing apparatus according to claim 1, wherein the setting unit sets a region of interest in the first diffusion-weighted image and sets the target diffusion coefficient based on a pixel value included in the region of interest.

4. The image processing apparatus according to claim 1, further comprising:
   a provision unit that displays candidates of the target diffusion coefficient,
   wherein the setting unit sets the target diffusion coefficient from the candidates of the target diffusion coefficient.

5. The image processing apparatus according to claim 1, further comprising:
   a diffusion coefficient derivation unit that derives a diffusion coefficient,
   wherein the setting unit sets a first luminance condition for displaying the first diffusion-weighted image and a second luminance condition for displaying the second diffusion-weighted image,
   the diffusion coefficient derivation unit derives the diffusion coefficient based on the first luminance condition and the second luminance condition set by the setting unit, and
   the setting unit sets the derived diffusion coefficient as the target diffusion coefficient.

6. The image processing apparatus according to claim 5, wherein the setting unit sets a plurality of target diffusion coefficients.

7. The image processing apparatus according to claim 1, wherein the image acquisition unit acquires a third diffusion-weighted image imaged using a fourth b value, and the image derivation unit derives a virtual diffusion-weighted image of the fourth b value based on the third diffusion-weighted image.

8. The image processing apparatus according to claim 1, wherein the luminance condition includes at least one of a window width of a virtual diffusion-weighted image displayed on the display unit and a window level of the virtual diffusion-weighted image.

9. An image processing method in an image processing apparatus, the method comprising:

acquiring a first diffusion-weighted image of a first b value and a second diffusion-weighted image of a second b value;

setting a target diffusion coefficient and a third b value;

deriving a virtual diffusion-weighted image of the third b value based on the first diffusion-weighted image and the second diffusion-weighted image;

deriving a luminance condition for displaying the virtual diffusion-weighted image based on the target diffusion coefficient and the third b value; and displaying the virtual diffusion-weighted image on a display unit according to the derived luminance condition.

10. A non-transitory computer-readable storage medium which stores program for causing at least one processor to execute operations including:

acquiring a first diffusion-weighted image of a first b value and a second diffusion-weighted image of a second b value;

setting a target diffusion coefficient and a third b value;

deriving a virtual diffusion-weighted image of the third b value based on the first diffusion-weighted image and the second diffusion-weighted image;

deriving a luminance condition for displaying the virtual diffusion-weighted image based on the target diffusion coefficient and the third b value; and displaying the virtual diffusion-weighted image on a display unit according to the derived luminance condition.

11. The image processing apparatus according to claim 1, wherein the target diffusion coefficient is a range of diffusion coefficients.

* * * * *